Oct. 27, 1931.  J. P. CROWLEY  1,828,830
GLASS MELTING FURNACE
Filed Sept. 17, 1925

INVENTOR
Joseph P. Crowley.
Frank Fraser
ATTORNEY.

Patented Oct. 27, 1931

1,828,830

UNITED STATES PATENT OFFICE

JOSEPH P. CROWLEY, OF TOLEDO, OHIO, ASSIGNOR TO THE LIBBEY-OWENS-FORD GLASS COMPANY, OF TOLEDO, OHIO, A CORPORATION OF OHIO

GLASS MELTING FURNACE

Application filed September 17, 1925. Serial No. 56,829.

This invention relates to improvements in heating means for glass melting furnaces.

An object of the present invention is to uniformly distribute the gas flame on the surface of the molten glass in a glass melting furnace.

Another object of the invention is to conserve on the amount of fuel used in a glass melting furnace.

A further object of the invention is to provide for a more uniform and efficient method of melting the glass batch in a glass melting furnace by confining the heating flame to the lower part of the vault above the molten glass.

Other objects and advantages of the invention will become apparent during the course of the following description.

In the usual form of glass melting furnaces of the regenerative type using natural gas for fuel, there is provided a plurality or series of regenerative ports arranged at opposite sides of the furnace, and the gas is supplied to the furnace by burners placed adjacent to and communicating with said ports. The gas as it enters the furnace ports unites with heated air which is being continuously forced therethrough to provide a flame which is discharged into the heating chamber of the furnace.

Due to the constantly varying pressure of the gas entering the regenerative ports, the flame resulting from the combustion of gas and heated air will vary correspondingly so that an even and constant flame of substantially uniform intensity and velocity will not be supplied into the heating chamber of the furnace. Consequently, with such an arrangement, when the pressure of the gas increases, more gas is used than is necessary, and when the gas pressure decreases less gas is used than is necessary. The disadvantages of such a type of furnace can be readily appreciated.

The present invention consists essentially in the provision of means for causing a flame of relatively constant pressure and intensity to be uniformly distributed over the molten glass in the furnace. The gas supplying means provided by the present invention comprehends the provision of a gas box positioned beneath each regenerative port and communicating with the furnace preferably, though not essentially, directly beneath the ports so that the gas issuing from the boxes will mix with the heated air issuing from the regenerative ports to form an exceedingly hot, wide and flat flame. As the opposite pairs of cooperating regenerators and gas boxes on each side of the furnace are identical in construction, just one side has been illustrated.

Figure 1:
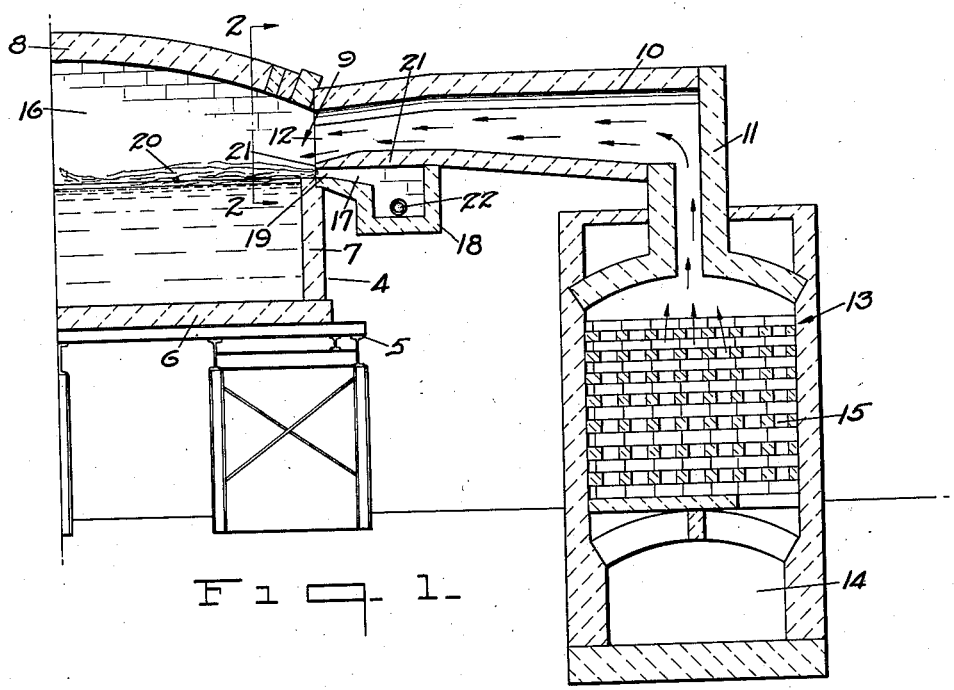
Fig. 1 is a transverse vertical section through one of a pair of cooperating regenerators and gas boxes, and one-half of a furnace.

The furnace and regenerator installation is of the well-known standard type, comprising a tank 4, supported on a suitable structure 5. The tank comprises a bottom 6 having sidewalls 7 extending upward therefrom and a cover-arch 8 supported on the sidewalls. Placed in the sidewalls just above the glass level is a plurality of cooperating regenerative ports 9. Communicating with these ports by means of the passages 10 and 11 are the regenerators 13. The passage 10 terminates at the port 9 in th form of an arched opening 12. Referring to the regenerator 13, air is drawn in through the tunnel 14, and after passing up through the heated checker work 15 and the passages 10 and 11, is delivered through the port 9 to the vault 16 above the glass or glass producing materials in the tank 4. Also communicating with the furnace ports 9 by means of passages 17 are the gas boxes 18, preferably positioned directly beneath the heated air passages 10, and extending transversely thereof. The gas passages 17 terminate at the port 9, preferably in the form of a long narrow horizontal slot 19 from which the gas flame 20 ejects. The portion 21 of the lower part of the passage 10 forms the upper part of the gas box 18 and also serves as a partition, separating the air passage 10 from the gas passage 17.

Both of the passages 10 and 17 are in open communication with the vault 16.

In accordance with the present invention, gas is supplied to the boxes 18 preferably through pipes 22 sealed in the end walls thereof. After the boxes 18 have been filled with the gas, the said gas is permitted to flow outwardly through the slot 19 where it will unite with the heated air. While the amount of gas issuing from the pipe 22 into the boxes 18 may vary or fluctuate, yet the amount of gas flowing from the boxes through the long narrow slot 19 will be relatively constant, this being due to the fact that there will always be a sufficient amount of gas in the boxes 18. The amount of gas used can be effectively controlled by regulating the size of the slot 19.

The gas supplying means as just described used in combination with a regenerator type furnace, provides for gas to be delivered thereto at a low pressure and in a relatively constant manner, during the interval of firing at the respective sides of the furnace. It is believed the gas flame resulting from this improved method of "gassing" will be hotter and more effective than the one obtained from the ordinary methods. This is a very important feature as it means a reduction in the time required for fusing the materials in the glass batch, which consequently results in a lower fuel consumption.

It is to be understood that this improved method of "gassing" a furnace is not limited to regenerative type as illustrated and described herein, but may be used in connection with the recuperative type or any combination thereof.

In Fig. 1 the side of the furnace illustrated is shown being fired by the improved method. The firing apparatus on the side of the furnace, not shown, which cooperates with and is identical to the one shown firing, is in open communication with a stack remote from the furnace. Within the stack a draft is created of sufficient magnitude to draw air from the tunnel 14 through the heated checker work 15 in the regenerator 13 and the passages 10 and 11. The gas boxes, which are the main feature of this invention, are preferably filled with natural gas when the same is available. The gas from these boxes, uniting with the heated air at the ports in the heated vaults 16, forms an exceedingly hot, wide and flat flame 20 which plays across and substantially upon the surface of the molten glass and the glass making materials. The burnt heated gases produced by the combustion of the air and raw gas are drawn across the vault 16 by the draft created in the stack down through the regenerator on the opposite side of the furnace, heating the checker work therein, and out through the stack.

At intervals the direction of fire is reversed, so the side of the furnace shown in Fig. 1 as firing, will function in the same manner as its cooperating opposite side now does when the firing is reversed.

It will be noted that a gas box of this preferred form will not permit any more gas to be drawn therefrom than the furnace is capable of utilizing. In other words, it will tend toward a more complete combustion of all the raw gas entering the furnace.

Figure 3:
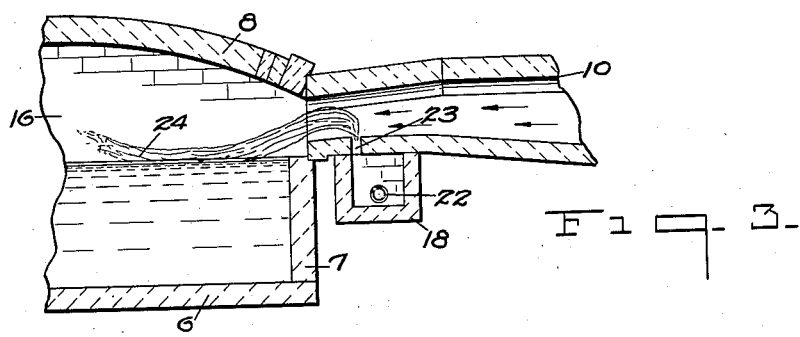
Fig. 3 is a modified form of gas box.
Figure 2:
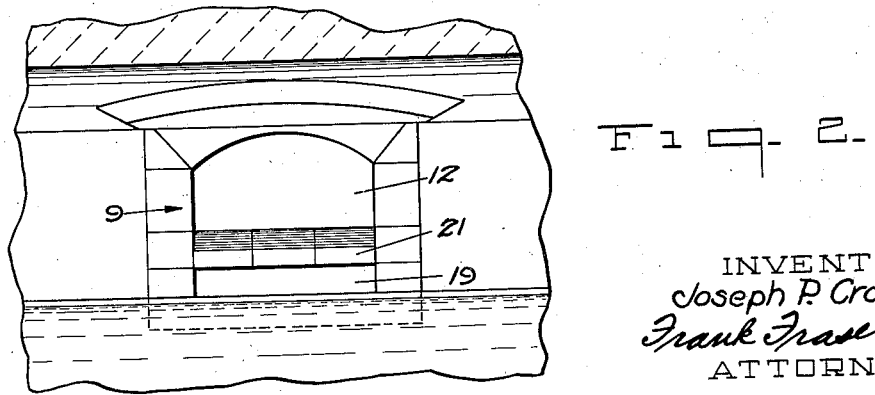
Fig. 2 is a sectional elevation on line 2—2 in Fig. 1, showing the gas and air openings.

The modified form of the gas box shown in Fig. 3 has its outlet communicating directly with the heated air passages 10 in the form of a long narrow vertical slot 23, from which the gas flame 24 emits. It is believed that the flame emitting from this form of gas box will have a rolling or swirling motion across the surface of the molten glass and glass batch in the tank, and differs in that respect from the low flat flame produced by the gas box covered by the main embodiment of the invention.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A glass melting furnace including a plurality of regenerative ports and a plurality of gas boxes extending transversely of the ports and communicating with the furnace directly beneath said ports in a manner to create a flame having substantially a longitudinal continuity equal to the length of the plurality of regenerative ports.

2. A glass melting furnace including a plurality of regenerative ports for supplying air thereto and a plurality of gas boxes provided with independent passages, each terminating in a single substantially narrow slot and communicating with the furnace directly beneath one of said ports.

3. A glass melting furnace including a plurality of regenerative ports for supplying air thereto and a plurality of gas boxes provided with independent passages, each terminating in a single substantially narrow slot for feeding gas to the furnace directly beneath the said ports whereby the gas and air will unite to create a flame having substantially a longitudinal continuity equal to the length of the plurality of regenerative ports.

4. A glass melting furnace including a plurality of regenerative ports for supplying air thereto, and a plurality of gas boxes having independent passages each terminating in a single slot communicating with the furnace for creating a flame having substantially a longitudinal continuity equal to the length of the plurality of regenerative ports.

5. A glass melting furnace including a plurality of ports for supplying air thereto, and a plurality of gas boxes, each having a passage terminating in a single substantially narrow slot for feeding gas to said furnace.

6. A glass melting furnace, including a plurality of air intake ports, and a plurality of gas boxes arranged beneath the ports and each having a passage terminating in a single substantially narrow slot for supplying gas to the furnace.

7. A glass melting furnace, including a plurality of air intake ports, and a plurality of gas boxes, one being provided for each port and having a passage communicating with the furnace therebeneath.

8. A glass melting furnace, including an air intake port, and a gas box extending transversely of the port and having a passage terminating in a single substantially narrow slot communicating with the furnace therebeneath.

9. In combination with a plurality of passages for feeding air to a glass melting furnace, a plurality of gas boxes, one being arranged beneath each passage and being provided with a passage through which gas is fed to the furnace.

10. A glass melting furnace, including a melting tank having an air intake port, a regenerator communicating with said port by means of a substantially horizontal passage for supplying air thereto, and a relatively small gas box positioned beneath said passage inwardly of said regenerator and closely adjacent the furnace, said box communicating with the furnace in proximity to said port for supplying gas thereto.

11. A glass melting furnace, including a melting tank having a plurality of air intake ports, a plurality of regenerators, one communicating with each of said ports by means of a substantially horizontal passage for supplying air thereto, and a plurality of relatively small gas boxes, one being provided beneath each of said passages inwardly of its respective regenerator and closely adjacent the furnace, said boxes communicating with the furnace in proximity to said ports for supplying gas thereto.

Signed at Toledo, in the county of Lucas, and State of Ohio, this 14th day of September, 1925.

JOSEPH P. CROWLEY.